United States Patent [19]

Teramoto et al.

[11] Patent Number: 4,794,159

[45] Date of Patent: Dec. 27, 1988

[54] HEAT-RESISTANT POLYAMIDE FROM BIS(4-AMINOPHENYL)FLUORENE

[75] Inventors: Takero Teramoto; Kazuaki Harada; Hiroharu Inoue, all of Kawasaki, Japan

[73] Assignees: Nippon Steel Corporation; Nippon Steel Chemical Co., Ltd., both of Tokyo, Japan

[21] Appl. No.: 41,249

[22] Filed: Apr. 22, 1987

[30] Foreign Application Priority Data

Apr. 22, 1986 [JP] Japan .................. 61-91354
Jun. 11, 1986 [JP] Japan .................. 61-133881
Mar. 4, 1987 [JP] Japan .................. 62-47688
Mar. 4, 1987 [JP] Japan .................. 62-47689

[51] Int. Cl.$^4$ ............................................. C08G 69/32
[52] U.S. Cl. .................................... 528/344; 528/338; 528/339; 528/340
[58] Field of Search ............... 528/344, 338, 339, 340

[56] References Cited

PUBLICATIONS

Korshak et al., J. Macromol. Sci., Rev. Macromol. Chem., C 11, 45 (1974).

Primary Examiner—Harold D. Anderson
Attorney, Agent, or Firm—Wenderoth, Lind & Ponack

[57] ABSTRACT

A heat-resistant polyamide having a repeating unit represented by the formula (I):

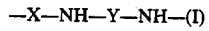

wherein X represents the structure (A):

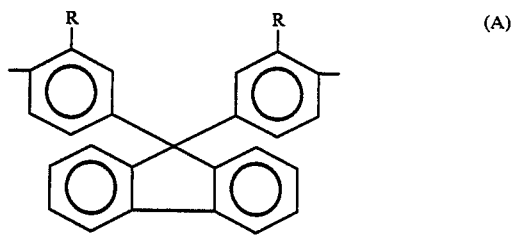

or the structure (A) and the structure (B) —$C_mH_{2m}$— wherein R represents hydrogen, methyl, or ethyl and m is an integer of 2 to 8; and Y represents the structure (C)

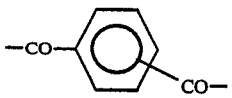

and the structure (D) —CO—$C_nH_{2n}$—CO— wherein n is 2 to 6, provided that Y may be the structure (C) when X is the structures (A) and (B), said polyamide having an inherent viscosity ($\eta_{inh}$) of at least 0.25 dl/g as determined at a temperature of 30° C. in a solution of 0.5 g of the polyamide in 100 ml of dimethylacetamide.

4 Claims, No Drawings

HEAT-RESISTANT POLYAMIDE FROM BIS(4-AMINOPHENYL)FLUORENE

BACKGROUND OF THE INVENTION

1. Field of the Invention

The present invention relates to novel heat-resistant polyamides having specific heat resistance and moldability or solubility features, and useful as a base material for fibers, films, and moldings such as injection moldings.

2. Description of the Related Art

When aliphatic polyamides are formed into fibers, they are considered to be excellent fibers for use in, for example, clothing. But, aliphatic polyamide fibers, although having a great elongation, have a lower strength and modulus, and an inferior heat resistance, compared with aromatic polyamide fibers, and therefore, the uses thereof are limited.

Aromatic polyamides, however, have a higher softening point and melting point, and an extremely good heat resistance, such as strength maintenance at high temperature, and mechanical characteristics such as strength and modulus. But, when formed into fibers, the elongation is as low as less than 5%, and there is a drawback in that the fiber itself may be fibrillated and fractured into a number of strings because the fiber is produced by liquid crystal spinning of an aromatic polyamide.

Aramide, which is a typical all aromatic polyamide fiber, is known as a polyamide useful for the formation of a high tenacity fiber, having a prolonged heat-resistant temperature of about 220° C. When this aramide is formed into fibers, however, it must be first made into a solution. Such a solution has been prepared by using dimethylacetamide or hexamethylenephosphoramide containing lithium chloride or calcium chloride suspended therein as the solvent, but the suspended lithium chloride or calcium chloride may cause clogging in a pipe, thereby resulting in production problems such as equipment failure.

Also, when manufacturing molded products, it is difficult to carry out injection molding due to the high heat resistance of the aramide. Thus, this aromatic polyamide is difficult to work, in spite of a high performance in general.

Korshak et al reported a soluble polyamide in the Journal of Macromolecule Science (J. Macromol. Sci., Rev. Macromol. Chem., C11, 45, 1974), but an example having both solubility and moldability, while maintaining the heat resistance at a high level, is not disclosed in this report.

Generally speaking, an aromatic polyamide having a high rigidity and asymmetry has excellent mechanical properties but has a high melting point, which is approximate to the decomposition point, and therefore, melt molding of this polyamide is difficult. Further, this polyamide has an inferior solubility, and thus cannot be easily used as an industrial material.

As mentioned above, poly(p-phenyleneterephthalamide), which is a typical aromatic polyamide, is soluble in conc. sulfuric acid or hexamethylphosphorylamide or N-methylpyrrolidone containing lithium chloride, calcium chloride, etc., dissolved therein, but still has a low solubility and, therefore, is difficult to use as a solution.

On the other hand, an aliphatic polyamide has an inferior heat resistance, and even a polyterephthalic amide partially converted to an aromatic does not have sufficient heat resistance. For example, when hexamethylenediamine or propylenediamine is used as the amine component, problems of not only heat resistance but also solubility arise.

Also, although an improvement of the solubility makes film or fiber working easier, it does not assist the working of a molded product for machinery and electrical parts. Usually, the injection molding of a synthetic resin can be widely used, but in this case, the heat resistance of the synthetic resin poses a problem.

If the heating temperature during injection molding is elevated, the synthetic resin will undergo thermal decomposition, lowering the physical properties of the molded product. Therefore, the lower limit of the molding temperature for crystalline synthetic resins in general is accepted to be preferably higher by about 30° C. than the melting point (Tm) thereof, and for amorphous polymers, higher by about 100° C. than the glass transition point (Tg). In either case, the synthetic resin temperature during injection molding must be at a temperature which is approximately 50° C. or more lower than the thermal decomposition temperature of the synthetic resin.

In other words, if the upper limit of the heating temperature in injection molding is 400° C., as required by the equipment, the upper limit of the Tm is 370° C. in crystalline polymers and the upper limit of the Tg is 300° C. in amorphous polymers.

SUMMARY OF THE INVENTION

Accordingly, the objects of the present invention are to eliminate the above-mentioned disadvantages of the prior art and to provide novel polyamides in which the glass transition point can be controlled to satisfy the conditions mentioned above, depending on the conditions during injection molding, and having a necessary heat resistance.

Another object of the present invention is to provide a polyamide in which the drawbacks of an aromatic polyamide and an aliphatic polyamide are alleviated, in that the present polyamide has the solubility and high heat resistance expected of a polyamide, and in addition, has a good molding workability when utilizing heat.

Other objects and advantages of the present invention will be apparent from the following description.

In accordance with the present invention, there is provided a heat-resistant polyamide having a repeating unit represented by the formula (I):

wherein X represents the structure (A):

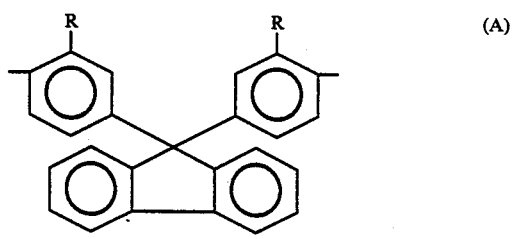

or the structure (A) and the structure (B) $-C_mH_{2m}-$ wherein R represents hydrogen, methyl, or ethyl and m is an integer of 2 to 8; and

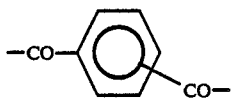

and the structure (D) —CO—$C_nH_{2n}$—CO— wherein n is 2 to 6, provided that Y may be the structure (C) when X is the structures (A) and (B); the polyamide having an inherent viscosity ($\eta_{inh}$) of at least 0.25 dl/g as determined at a temperature of 30° C. in a solution of 0.5 g of the polyamide in 100 ml of dimethylacetamide.

DESCRIPTION OF THE PREFERRED EMBODIMENTS

The polyamide of the present invention has a repeating unit, —X—NH—Y—NH— containing an amide bond obtained by dehydrating condensation between a diamine and a dicarboxylic acid. In this case, as the diamine which is the starting material for the structure (A), 9,9-bis(4-aminophenyl)fluorene, 9,9-bis(3-methyl-4aminophenyl)fluorene, 9,9-bis(3-ethyl-4-aminophenyl)fluorene can be used. The structure (A) represents a residue of a diamine from which the amino groups at both terminal ends are removed.

As the starting material for the structure (B), methylenediamine, 1,2-ethylenediamine, 1,3-propylenediamine, 1,4-butylenediamine, 1,5-pentamethylenediamine, hexamethylenediamine, heptamethylenediamine, octamethylenediamine, and the like may be employed. The preferable starting material for the structure (B) is the industrially producible, less expensive 1,3-propylenediamine and hexamethylenediamine, and the most preferable material is 1,3-propylenediamine.

Also, the component (X) in the formula (I) comprises the structures (A) and (B) and the proportions of both, which are related to the solubility of the polyamide formed, are preferably 60/40 to 99/1 in terms of the molar ratio of (A)/(B).

That is, if the molar ratio of the structure (B) in the polyamide of the present invention exceeds 40, the solubility thereof will be lowered. For example, when carrying out polymerization with predetermined amounts of terephthalic chloride and 9,9-bis(4-aminophenyl)-fluorene, together with hexamethylenediamine or propylenediamine in dimethylacetamide or N-methyl-pyrrolidone, the polyamide will be precipitated in the course of the polymerization, and thus it will become difficult to obtain a polyamide having a high degree of polymerization. Further, although the terminal ends of the polyamide may be left untreated, preferably the polyamide is made substantially non-oxidizable by carrying out an acylation of the amino groups. As the acyl group, acetyl group or benzoyl group is suitable.

On the other hand, the dicarboxylic acids which are the starting materials for Y compiise an aromatic dicarboxylic acid (the residue of hydroxyl groups removed at both terminal ends is called (C)) and an aliphatic dicarboxylic acid (the residue of the hydroxyl groups removed at both terminal ends is called (D)). The aromatic dicarboxylic acid may be preferably terephthalic acid or isophthaiic acid, and the aliphatic dicarboxylic acid may include dicarboxylic acids capable of readily giving the desired glass transition temperature, for example, those with an n of 2 to 6 such as succinic acid (n=2), glutaric acid (n=3), adipic acid (n=4), pimelic acid (n=5), and suberic acid (n=6), etc. More preferable is a combination of the structure (C), which is a terephthalic acid residue and the structure (D) which is an adipic acid residue, wherein n is 4.

Further, in the formula, Y comprises the cases of the structures (C) and (D), preferably at a molar ratio of (C)/(D) of from 1/99 to 99/1, more preferably from 5/95 to 95/5. In this case, the glass transition temperature of the polyamide is an injection moldable glass transition temperature of 135° C. to 350° C., preferably, 135° C. to 300° C. The glass transition temperature as mentioned above is a preferable temperature range for injection molding as previously described. That is, these values are selected in view of the capacity of presently available injection molding machines. The polyamide is provided with an excellent specific feature by corresponding to these values through a selection of the formulation ratios of the structures (C) and (D).

In the polyamide of the present invention, the inherent viscosity ($\eta_{inh}$) obtained by measuring a solution of 0.5 g of the polyamide dissolved in 100 ml of dimethylacetamide at 30° C. is 0.25 dl/g or more, preferably 0.30 dl/g or more, more preferably 0.35 to 5 dl/g.

If the value of the inherent viscosity is small, it is difficult to form the polyamide into a film or a molded product by molding, and in addition, the molded product becomes brittle. Also, the Tg and decomposition temperature will be lowered, which lowers the heat resistance.

During injection molding, it is essential that heat be applied, and an aromatic amine, namely an aniline derivative, is extremely susceptible to oxidation, as is well known in the art. Therefore, the terminal aniline groups of the polyamide are similarly susceptible to oxidation. Accordingly, by making the moles (or mole numbers) of the dicarboxylic acid (starting material for Y) greater than the moles of the dimmine (starting material for X) used during polymerization, the presence of aniline groups at the terminal ends is substantially prevented. Alternatively, by making the moles of the diamine rather greater than the moles of the dicarboxylic acid used, the terminal amino groups are protected. For example, preferably an alkyl halide or an acyl halide, more preferably an acyl halide, most preferably an acetyl halide or benzoyl halide, is allowed to react with the terminal amino groups to convert the terminal ends to amide groups. Accordingly, coloration due to oxidation can be prevented to a considerable extent. Further, little coloration will be observed in the polyamide solution even when stored for a long term. The polyamide is not only useful for injection molding, but also is soluble in certain kindsoof solvents, and can be satisfactorily molded into films and fibers.

When the polyamide of the present invention comprises the structures (A), (B), and (C), the glass transition temperature (Tg) is preferably 400° C. or less, more preferably 200° to 400° C., to ensure the required heat resistance and ease of thermal molding working of the polyamide.

The polyamide should be soluble in at least pyridine, m-cresol, o-chlorophenol, N-methylpyrrolidone, and dimethylacetamide. When the polyamide is dissolved into this solvent and formed into a fiber or a film, a colorless and transparent product is obtained. The polyamide according to the present invention is colorless and has an improved solubility and heat resistance compared with the prior art products, and has good mechanical properties and electrical properties. It is also possible to conrrol the glass transition temperature and, therefore, thermal molding working can be easily carried out.

The polyamide can be synthesized, for example, as follows. That is, 9,9-bis(4-aminophenyl)fluorenes are dissolved in a solvent such as dimethylacetamide and allowed to react with a mixture of terephthalic chloride and adipic chloride constituting the compnnent Y at about 5° C. for 3 hours, whereby a desired polyamide can be obtained.

Alternately, the polyamide of the present invention can be obtained by dissolving 9,9-bis(4-aminophenyl)-fluorene and diamine and further triethylamine and the like in a solvent such as dimethylacetamide and gradually adding terephthalic chloride while cooling to a low temperature such as 5° C., to carry out the reaction for about 2 hours. Synthesis can be conducted under similar reaction conditions by using various diamines and dccarboxylic acids.

The polyamide of the present invention has an improved heat resistance and solubility compared with the terephthalic acid—hexamethylenediamine system or the terephthalic acid—propylenediamine system polyamides of the prior art, and therefore, the scope of use and the working method can be broadened to make it more widely utilizable.

That is, almost any molding method for injection molding, fibers, films, etc., can be used, and therefore, the material is not limited to the fields of electrical and electronic parts, and machinery, as in the prior art, but can be used in new fields, particularly a field in which heat resistance is required. Thus, the polyamide of the present invention is industrially useful.

EXAMPLES

The present invention now will be further illustrated by, but is by no means limited to, the following Examples and Comparative Examples.

EXAMPLE 1

To a solution of 6.96 g of 9,9-bis(4-aminophenyl)fluorene and 4.04 g of triethylamine dissolved in 100 ml of dimethylacetamide, was added 2.03 g of terephthalic chloride in the form of powder at 5° C. Then, 1.83 g of adipic chloride was added, followed by stiriing for 3 hours.

Further, 0.5 ml of benzoyl chloride was added and the mixture stired at room temperature for 2 hours. The triethylamine hydrochloride was filtered with a glass filter and poured into methanol to obtain a polymer. Repreciptation purification was conducted twice with dimethylacetamide and methanol.

The reaction was also carried out when the charged molar ratios of terephthalic chlorid and adipic chloride were changed. The results are summarized in Table 1. The cases in which only adipic acid chloride and when only terephthalic chloride are used are shown as comparative examples.

In Example 1, the properties of the polyamide composed of adipic acid/terephthalic acid=9/1 (mole ratio) are as follows:

| | |
|---|---|
| Tensile strength: | 9.5 kgf/mm$^2$ |
| Tensile modulus: | 450 kgf/mm$^2$ |
| Volume resistivity: | 9 × 10$^{15}$ Ω · cm |
| Overall light transmittance: | 90.8% |

EXAMPLE 2

The same procedures as in Example 1 were carried out, except that benzoyl chloride was not added. The viscosity, Tg, and decomposition temperature were the same in both cases.

TABLE 1

| Adipic chloride/ Terephthalic chloride | Solubility[1] | | | | | $\eta_{inh}$[2] [dl/g] | Tg[3] [°C.] | Decomposition temperature[3] [°C.] |
|---|---|---|---|---|---|---|---|---|
| | Pyridine | m-Cresol | N—methyl-pyrrolidone | Toluene | Methylene chloride | | | |
| 10/0 [Molar ratio] | ◎ | ◎ | ◎ | x | x | 0.37 | 130 | 395[4] |
| 9/1 | ◎ | ◎ | ◎ | x | x | 0.41 | 190 | 415 |
| 8/2 | ◎ | ◎ | ◎ | x | x | 0.46 | 245 | 415 |
| 7/3 | ◎ | ◎ | ◎ | x | x | 0.53 | 280 | 420 |
| 5/5 | ◎ | ◎ | ◎ | x | x | 0.42 | 290 | 435 |
| 7/3 | ◎ | ◎ | ◎ | x | x | 0.57 | 300 | 460 |
| 0/10 | ◎ | ◎ | ◎ | x | x | 0.66 | 380 | 495[4] |

[1]◎Readily soluble, x insoluble
[2]Inherent viscosity $\eta_{inh}$ as obtained by measuring a solution of 0.5 g of the polymer dissolved in 100 ml of dimethylacetamide at 30° C. by an Ostwalt viscometer.
[3]Decomposition temperature and glass temperature were the same in the treatment of terminal ends and in the non-treatment thereof.
[4]Comparative examples

EXAMPLE 3

To a solution of 4.18 g of 9,9-bis(4-aminophenyl)fluorene (AF), 0.59 g of 1,3-propylenediamine (DA) and 4.04 g of triethylamine dissolved in 100 ml of dimethylacetamide was gradually added 4.06 g of terephthalic chloride (powder) with stirring while cooling to 5° C. After stirring for 3 hours, the triethylamine hydrochloride by-product of the reaction was filtered off, and the filtrate was poured into methanol to reprecipitate the polymer. The polyamide obtained by filtration of the precipitate was then dried by heating to obtain the desired product. The yield was found to be 100%.

An IR-ray absorption spectrum of the polyamide exhibited a characteristic absorption of a polyamide, wherein the absorption of NH was 3250 cm$^{-1}$, the absorption of the amide carbonyl group was 1660 cm$^{-1}$, the absorption of the aliphatic was 3000 to 2850 cm$^{-1}$, and the absorption of the aromatic was 3200 to 3000 cm$^{-1}$, 1620 cm$^{-1}$ to 1510 cm$^{-1}$.

Also, polymerization was carried out in the same manner as in Example 3 except that the charged amount was changed to 5.57 g of 9,9-bis(4-aminophenyl)fluorene and 0.30 of 1,3-propllenediamine.

The characteristics of the polyamide obtained are shown in Table 2. In Table 2, the characteristics of the polyamide obtanned from 4.18 g of 9,9-bis(4-aminophenyl)fluorene and terephthalic chloride are shown as a comparative example.

EXAMPLE 4

To a solution of 4.18 g of 9,9-bis(4-aminophenyl)fluorene, 0.59 g of 1,3-propylenediamine and 4.04 g of triethylamine dissolved in 100 ml of dimethylacetamide was gradually added 4.06 g of terephthalic chloride in the form of a powder, with stirring while cooling to 5° C. After 2 hours, 0.5 ml of benzoyl chloride was added and the mxxture was stirred at room temperature for 2 hours. After the by-product triethylamine hydrochloride was filtered off, the filtrate was poured into methanol, and the precipitated polymer was filtered and washed, followed by drying with heating to obtain the desired polyamide. The yield was found to be 99%.

The IR-ray absorption spectrum of the polyamide exhibited an absorption of NH of 3240 cm$^{-1}$, an absorption of the aromatic of 3200 to 3000 cm$^{-1}$, an absorption of the aliphatic of 3000 to 2900 cm$^{-1}$, an absorption of amido carbonyl of 1660 cm$^{-1}$, and an absorption of the aromatic of 1610, 1530 cm$^{-1}$. Also, polymerization was carried out in the same manner as in Example 4 except that 5.57 g of 9,9-bis(4-aminophenyl)fluorene and 0.30 g of 1,3-propylenediamine were used. The characteristics of the polyamide obtained are shown in Table 2.

EXAMPLE 5

To a solution of 6.26 g of 9,9-bis(4-aminophenyl)fluorene (AF), 0.12 g of hexamethylenediamine (HMDA) and 4.04 g of triethylamine dissolved in 100 ml of dimethylacetamide was gradually added 4.06 g of terephthalic chloride while cooling to 5° C. After a reaction of 2 hours, the by-product triethylamine hydrochloride was filtered off, and the reaction mixture then poured into methanol. The precipitated polyamide was filtered, heated, and dried.

The characteristics of the polyamide obtained are shown in Table 3. In Table 3, the characteristics of the polyamide obtained from hexamethylenediamine and terephthalic chloride are shown as a comparative example.

EXAMPLE 6

After dissolving 6.26 g of 9,9-bis(4-aminophenyl)fluorene, 0.12 g of hexamethylenediamine and 4.04 g of triethylamine in 100 ml of dimethylacetamide and carrying out the reaction at 5° C. for 2 hours, 0.5 ml of benzoyl chloride wasaadded, and the mixture was stirred at room temperature for 2 hours. The by-product triethylamine hydrochloride was filtered off, the polyamide was then precipitated by pouring the filtrate into methanol, filtered, and dried by heating. Also, similar reactions were carried out by changing the amounts of 9,9-bis(4-aminophenyl)fluorene and hexamethylenediamine as shown in No. 2 et seq in Table 4. The samples of No. 5 et seq were not soluble in the compounds listed in Table 3 and also in dimethylacetamide, and therefore the inherent viscosities were not able to be determined.

The resulting solubilities and heat resistance, etc., are summarized in Table 3. In each IR-ray absorption spectrum of the polyamides obtained in Examples 5 and 6, the respective absorptions could be seen at 3300 cm$^{-1}$ for NH, 3200 to 3000 cm$^{-1}$ for the aromatic, 3000 to 2800 cm$^{-1}$ for the aliphatic, 1680 to 1670 cm$^{-1}$ for amidocarbonyl, and 1610, 1500 cm$^{-1}$ for the aromatic.

The inherent viscosity ($\eta_{inh}$) shown in the Tables in Examples of the present invention was determined by measuring a solution of 0.5 g of the obtained polyamide dissolved in 100 ml of dimethylacetamide at 30° C. Also, the glass transition temperature and the IR-ray absorptionsspectrum shown in the Examples of the present invention were measured after formation of a film. Film formation was effected by preparing a thin film from a solution dissolved in dimethylacetamide, etc. The preparation of a thin film was easily accomplished.

TABLE 2

| AF/PDA (molar ratio) | Solubility | | | | | | | | | | $\eta_{inh}$ [dl/g] | Tg [°C.] | Remarks |
| --- | --- | --- | --- | --- | --- | --- | --- | --- | --- | --- | --- | --- | --- |
| | Pyridine | m-Cresol | o-Chlorophenol | NMP | DMAC | Chloroform | Methylene chloride | Toluene | Benzene | THF | | | |
| 10/0 | ◉ | ◉ | ◉ | o | o | x | x | x | x | x | 0.66 | 380 | Comparative example |
| 8/2 | ◉ | ◉ | ◉ | ◉ | ◉ | x | x | x | x | x | 0.37 | 320 | Examples 3 and 4 |
| 6/4 | o | o | o | ◉ | ◉ | x | x | x | x | x | 0.31 | 295 | Examples 3 and 4 |

Note
[1]Solubility in the Table represents solubility in the respective compounds shown in the Table, and the symbols have the following meanings:◉: readily soluble, o: soluble, x: insoluble. The abbreviations of the compounds in the Table denote the following: AF is 9,9-bis(4-aminophenyl)fluorene, PDA is 1,3-propylenediamine, NMP is N—methylpyrrolidone, DMAC is dimethylacetamide, and THF is tetrahydrofuran.
[2]The data in the Table show the values for the polyamide benzoylated at the terminal ends. The polyamide untreated at the terminal ends exhibited similar values. (Examples 3 and 4)

TABLE 3

| AF/HMDA (molar ratio) | Solubility | | | | | | | | $\eta_{inh}$ dl/g | Tg °C. | Remarks |
| --- | --- | --- | --- | --- | --- | --- | --- | --- | --- | --- | --- |
| | Pyridine | m-Cresol | o-Chlorophenol | NMP | DMAC | Chloroform | Methylene chloride | Toluene | | | |
| 10/0 | ◉ | ◉ | ◉ | ◉ | ◉ | x | x | x | 0.66 | 380 | Comparative example |
| 9/1 | ◉ | ◉ | ◉ | ◉ | ◉ | x | x | x | 0.81 | 360 | Examples 5 and 6 |
| 8/2 | ◉ | ◉ | ◉ | ◉ | ◉ | x | x | x | 0.41 | 315 | Example 6 |
| 7/3 | ◉ | ◉ | ◉ | ◉ | ◉ | x | x | x | 0.51 | 340 | " |
| 6/4 | o | ◉ | ◉ | ◉ | ◉ | x | x | x | 0.35 | 285 | " |
| 5/5 | x | x | x | x | x | x | x | x | (4) | — | Comparative example |
| 3/7 | x | x | x | x | x | x | x | x | (4) | — | Comparative |

TABLE 3-continued

| AF/HMDA (molar ratio) | Solubility | | | | | | | | $\eta_{inh}$ dl/g | Tg °C. | Remarks |
| --- | --- | --- | --- | --- | --- | --- | --- | --- | --- | --- | --- |
| | Pyridine | m-Cresol | o-Chloro-phenol | NMP | DMAC | Chloroform | Methylene chloride | Toluene | | | |
| 1/9 | x | x | x | x | x | x | x | x | (4) | — | Comparative example |
| 0/10 | x | x | x | x | x | x | x | x | (4) | — | Comparative example |

Note
(1) Solubility in the Table represents solubility in the respective compounds shown in the Table, and the symbols have the following meanings ⊚: readily soluble, o: soluble, x: insoluble.
(2) The data in the Table show the values for the polyamide benzoylated at the terminal ends. The polyamide untreated at the terminal ends exhibited similar values. (Examples 5 and 6)
(3) Glass transition temperature of the comparative example was not measured, because of film could not be formed.
(4) Not soluble

TABLE 4

| No. | 9,9-Bis(4-aminophenyl) fluorene (g) | Hexamethylene diamine (g) | Polyamide yield (%) |
| --- | --- | --- | --- |
| ① | 6.26 | 0.12 | 100 |
| ② | 5.56 | 0.24 | 100 |
| ③ | 4.87 | 0.36 | 95 |
| ④ | 4.17 | 0.48 | 97 |
| ⑤ | 3.48 | 0.60 | 100 |
| ⑥ | 2.09 | 0.84 | 95 |
| ⑦ | 0.70 | 1.08 | 100 |

We claim:

1. A heat-resistant polyamide having a repeating unit represented by the formula (I):

—X—NH—Y—NH—  (I)

wherein X represents the structure (A):

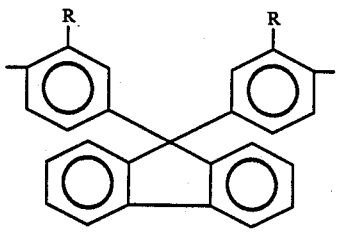

(A)

wherein R represents hydrogen, methyl or ethyl, or both the structure (A) and the structure (B) —$C_mH_{2m}$— wherein m is an integer of 2 to 8; and Y represents the structure (C)

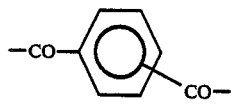

and the structure (D) —CO—C—$C_nH_{2n}$—CO— wherein n is 2 to 6, provided that Y is the structure (C) when X is both the structure (A) and (B), said polyamide having an inherent viscosity ($\eta_{inh}$) of at least 0.25 dl/g as determined at a temperature of 30° C. in a solution of 0.5 g of the polyamide in 100 ml of dimethylacetamide.

2. The heat-resistant polyamide as claimed in claim 1, wherein the component X in the formula (I) represents the structure (A) and the both component Y in the formula (I) represents the structures (C) and (D) and the mole ratio of the structure (C)/(D) is 1/99 to 99/1.

3. The heat-resistant polyamide as claimed in claim 1, hherein the component X in the formula (I) represents both the structures (A) and (B) and the component Y in the formula (I) represents the structure (C) and the mole ratio of the structures (A)/(B) is 60/40 to 99/1, the inherent viscosity ($\eta_{inh}$) of the polyamide being 0.30 dl/g or more as determined at a temperature of 30° C. in a solution of 0.5 g of the polyamide in 100 ml of dimethylacetamide.

4. A heat-resistant polyamide as claimed in claim 3, wherein said polyamide is at least soluble in pyridine, m-cresol, o-chlorophenol, N-methylpyrrolidone, or dimethylacetamide.

* * * * *